Figure 1:
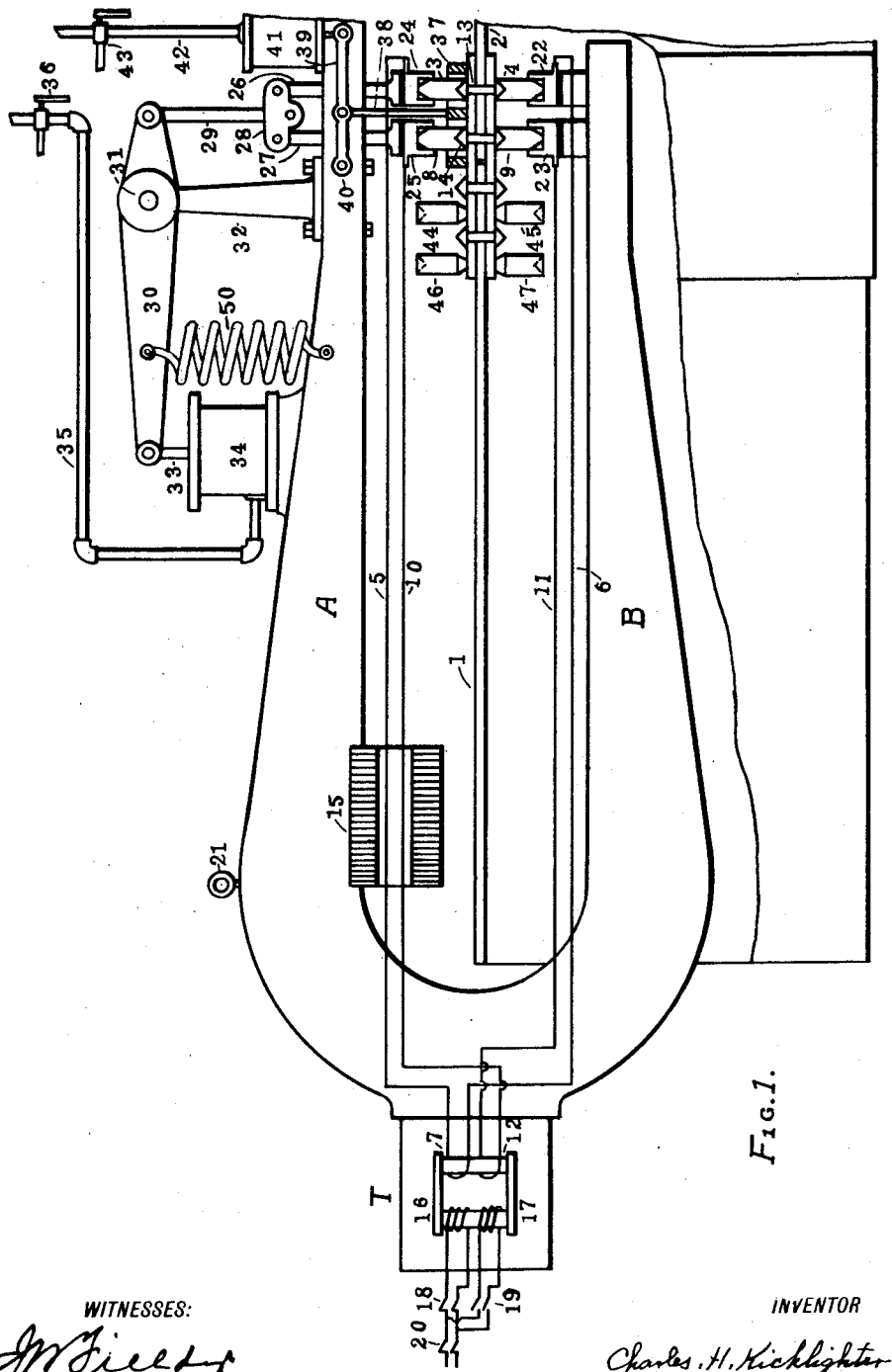

C. H. KICKLIGHTER.
METHOD OF ELECTRIC RIVETING.
APPLICATION FILED NOV. 28, 1913.

1,189,583.

Patented July 4, 1916.
2 SHEETS—SHEET 1.

WITNESSES:
J. W. Field
L. C. Clark

INVENTOR
Charles. H. Kicklighter.

C. H. KICKLIGHTER.
METHOD OF ELECTRIC RIVETING.
APPLICATION FILED NOV. 28, 1913.

1,189,583.

Patented July 4, 1916.
2 SHEETS—SHEET 2.

WITNESSES:
J. W. Field
L. C. Clark

INVENTOR
Charles H. Kicklighter.

UNITED STATES PATENT OFFICE.

CHARLES H. KICKLIGHTER, OF ATLANTA, GEORGIA.

METHOD OF ELECTRIC RIVETING.

1,189,583. Specification of Letters Patent. Patented July 4, 1916.

Application filed November 28, 1913. Serial No. 803,478.

*To all whom it may concern:*

Be it known that I, CHARLES H. KICK-LIGHTER, a citizen of the United States, residing at Atlanta, in the county of Fulton and State of Georgia, have invented new and useful Improvements in the Method of Electric Riveting, of which the following is a specification.

This invention relates to the method of and apparatus for riveting together metal plates or other objects, in which electric current is employed for heating the rivets and mechanical pressure is applied at the same time for forming the rivet heads and compressing the rivets. This operation has proven efficient and successful in many cases. But when it is attempted to link the heating current about a mass of iron or steel, as is necessary in the joining together of two sections of a boiler or similar work, the self-inductance due to the presence of the iron holds back the heating current, and eddy currents in the iron plates cause heating and a waste of energy. In my Patent 1,070,966 of August 19, 1913, on electric welding, and co-pending applications, Serial Numbers 795,311 and 800,166 of dates October 15, 1913, and November 10, 1913, respectively, I have illustrated means for preventing the self-inductance and eddy currents in analogous cases, in which the electric current was used primarily for heating and welding the metal plates.

One object of the present invention is to provide means for removing the self-inductance and eddy currents, which tend to interfere with the heating current, in cases where rivets are heated in position by electrical means and simultaneously subjected to mechanical pressure.

Another object of this invention is to provide means for operating upon a plurality of rivets at the same time.

Another object is to provide means for holding the plates firmly together around the rivet, while the riveting process is in progress.

Another object is to provide means for joining metal plates partly by electric riveting and partly by a number of spot welds through the thickness of the plates and distributed between and among the rivets.

Another object is to equalize the heating currents, so that in equal intervals of time similar results may be accomplished in the cases of the rivets simultaneously operated upon.

Other objects and advantages of this invention will hereinafter appear, and the novel features thereof will be specially pointed out in the appended claims.

In order that this process and some of the ways in which it can be applied may be clearly understood, reference is made to the accompanying drawing, forming a part of this specification, and in which,—

Figure 2:
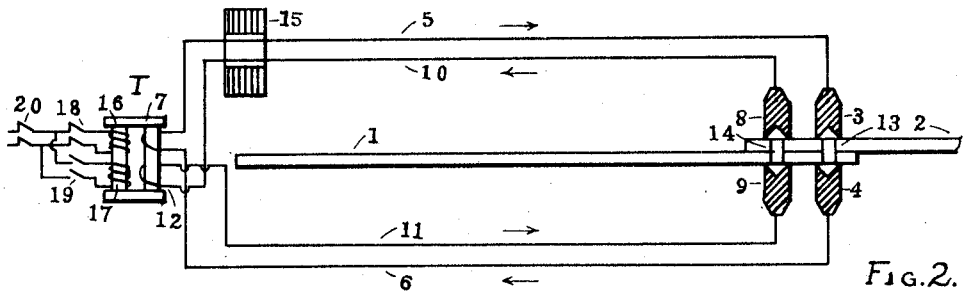
Figure 3:
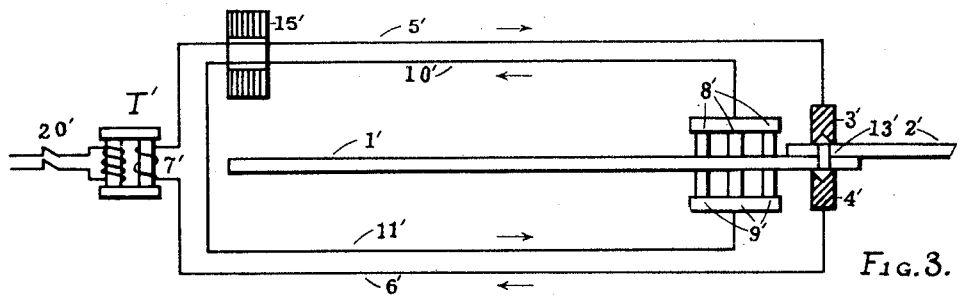
Figure 4:
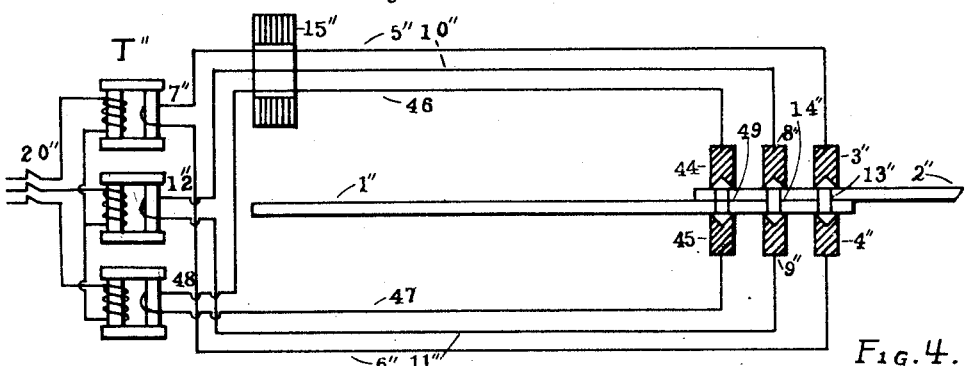
Figure 5:
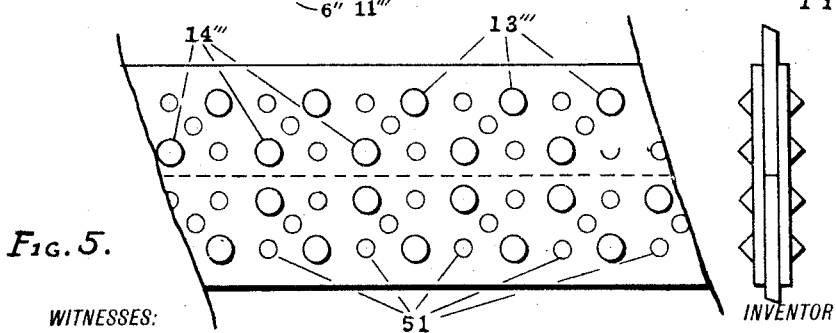

Figure 1 is an elevation, partially sectioned and with electrical connections in diagrammatic form, which serves to illustrate one of the ways in which the invention may be applied. Fig. 2 illustrates the electrical connections as employed in Fig. 1 in which two heating circuits are employed. Fig. 3 illustrates the use of one heating circuit and an accompanying auxiliary circuit in which current is induced by the heating current. Fig. 4 illustrates the electrical connections in which three heating circuits are employed, using current from a bank of transformers connected to a three-phase supply. Fig. 5 shows a small portion of the joint or seam of Fig. 1, in which is illustrated the combination of riveting and spot welding in joining metal plates.

For convenience of explanation, reference will be first made to Fig. 2, which shows the electrical connections in Fig. 1, and in which 1—2 illustrate two plates or two sections of a cylindrical shell. The heating terminals 3—4 of one heating circuit are connected by conductors 5—6 to one secondary 7 of a transformer T. The heating terminals 8—9 of a second heating circuit are connected by conductors 10—11 to a second secondary 12 of heating transformer T. The heating terminals 3—4 and 8—9 have one set of ends provided to form heads to rivets 13—14 and compress the same. The heating currents are passed through the rivets and mechanical pressure exerted upon them simultaneously. One set of conductors 5—10 are passed through or around a laminated ring or core 15. No flux will flow through this ring if heating currents are equal. But if one heating current tends to exceed the other, the flow or flux through ring 15 will be such that energy is subtracted from the one circuit and added to the other so as to maintain these heating currents about equal and insure good results. Two primary windings 16—17 with corresponding switches 18—19 are provided on the transformer T. The switch 18 is closed and primary 16 employed when electrically heating rivets 13—14. After a joint is riveted, it is desired to spot-weld the place together. The heating terminals 3—4 and 8—9 are reversed in their socket so that the other ends may be used for spot welding in the area between the rivets. As more energy and quicker action is necessary, switches 18 and 19 are closed so as to employ both primaries 16—17. The switch 20 connects to the supply.

Referring now to Fig. 1, the electrical connections of this were illustrated in Fig. 2 and the various parts of the electric circuits are indicated by the same characters therein employed. No further explanation of these electrical connections are deemed necessary. A strong steel or cast iron yoke A—B is employed to support the transformer T, with equalizing core 15 and the apparatus for applying the heating terminals. Yoke A—B may be carried about the shop and held in position to do its work by means of a traveling crane. An eyebolt 21 affords means for attaching a hook or cable. Terminals 4—9 are held in sockets 22—23 which are supported on yoke on B. Terminals 3—8 are held in sockets 24—25 which may be forced downward by rods 26—27. Rods 26—27 are connected through link 28 to rod 29. Rod 29 is connected to one end of a lever 30, supported at fulcrum 31 by standard 32 which in turn is mounted on yoke arm A. To the other end of lever 30 is attached rod 33 actuated by a piston in the hydraulic cylinder 34. Cylinder 34 is connected by pipe 35 and three-way valve 36 to the pressure supply. Spring 50 is adapted to act through the lever 30 and rods 29—27—26 so as to raise the terminals 3—8 when the pressure in cylinder 34 is released. Member 37, bearing upon the plate between and around the rivets 13—14, is adapted to be forced downward by rod 38 pivoted to rod 39. This is for the purpose of holding the plates in firm and immediate contact, while the rivets are being heated and formed and cooled. The lever 39 is pivoted at 40 to yoke arm A and is actuated at the extreme end by the piston of a hydraulic cylinder 41. Cylinder 41 is connected by pipe 42 and valve 43 to the pressure supply. At 44—45 and 46—47 are illustrated the relative positions of the reversed terminals 3—4 and 8—9 when these are pressed against the plates between rivets for the purpose of spot welding.

Fig. 5 illustrates a small portion of the joint in Fig. 1, which has been made by the combined method of riveting and spot welding. The large circles 13'''—14''' illustrate the heads of rivets employed in making the joints and arranged in rows. The small circles 51 indicate the location of spot welds, made through the metal plates in the area of lap between and among the rivets. A less number of rivets may be employed and a stronger joint obtained than is possible with rivets alone.

The operation of the apparatus as illustrated in Figs. 1 and 2 is as follows: The yoke A—B, suspended at 21 to a traveling crane or otherwise mounted, is brought into position so that rivets 13—14 of the work lie between heating and forming terminals 3—4 and 8—9 as illustrated. Open valve 43, so that the pressure admitted to cylinder 41 will force the plates firmly downward and together by a pressure transmitted through lever 39, rod 38 and member 37. Open valve 36, so that the pressure admitted to cylinder 34 will force the terminals firmly downward against the unheaded rivets 13—14. This pressure is transmitted through rod 33, lever 30, rod 29, member 28, rods 26—27, sockets 24—25 and terminals 3—8 to the rivets 13—14. Close switch 18 and 20. Heavy heating currents flow through rivets 13 and 14, heating and softening the rivets. As the rivets soften, the mechanical pressure, exerted in cylinder 34, forces terminals 3—8 downward toward fixed terminals 4—9. The pressures compress the softened rivets 13 14, forming heads at either or both ends and causing the rivets to fill and conform to the shape of the holes. Open switch 20 and, after the rivets have cooled sufficiently, relieve the pressures in 34 and 41 by operating valves 36 and 43. If currents of sufficient strength or duration be passed through rivets 13—14, these may not only be softened but brought to a welding heat so as to be fused and welded to the sides of the holes, thus forming with the plates practically a homogeneous mass. The path of the heating current for rivet 13 is through transformer secondary 7, conductor 5, socket 24, terminals 3, rivet 13, terminal 4, socket 22, conductor 6 back to secondary 7. The path of the heating current for rivet 14 is through transformer secondary 12, conductor 10, socket 25, terminal 8, rivet 14, terminal 9, socket 23, conductor 11 back to the secondary 12. The flux passing through core 15 holds these currents practically the same. After the riveting of the joint or seam has been completed, the terminals 3—4—8—9 are reversed in their sockets. They are brought against the plates between the rivets as per 44—45—46—47 in order to increase the efficiency of the joint by spot welding through the plates. Valve 36 may now be operated, and the pressure in cylinder 34 will force inverted terminals 3—4—8—9 firmly against the plates. Close switches 18—19—20. Both primaries 16 and 17 feed the transformer T and two welding currents flow making two spot welds simultaneously. Open switch 20, and when spot welds have cooled somewhat, operate handle 36 and relieve the pressure on the terminals.

Fig. 3 illustrates the use of only one heating and riveting circuit. The heating terminals 3'—4', connected by conductors 5'—6' to secondary 7', are forced against opposite ends of rivet 13' in its proper position in the hole. Auxiliary terminals 8' and 9' are forced against plate 1' directly opposed on opposite sides thereon. These terminals are linked through laminated iron core 15' and around the same iron material with which the primary or riveting circuit is linked. When switch 20' is closed, heavy heating current flows through 4', 6', 7', 5', 3' and the rivet 13', so as to heat and soften this rivet in order to allow the mechanical pressure to head and form the rivet. An auxiliary current, induced by the riveting current through ring 15', will flow through conductors 11'—10' and terminals 8'—9'. This current flows in a direction opposite to the riveting current and its function is to remove self-inductance and eddy currents which would otherwise interfere with the riveting current.

Fig. 4 illustrates the use of three heating and riveting circuits, connected to a three-phase supply. The currents in these circuits have an angular displacement of 120 degrees from one another. The heating terminals 3"—4", connected by conductors 5"—6" to secondary 7, are forced against opposite ends of rivet 13'. The heating terminals 8"—9", connected by conductors 10"—11" to secondary 12", are forced against opposite ends of rivet 14". The heating terminals 44—45, connected by conductors 46—47 to secondary 48, are forced against opposite ends of rivet 49. The primaries of the transformer bank T" are connected by switch 20". When this switch is closed, heavy heating current flows through the three circuits, simultaneously heating and softening rivets 13", 14" and 49. The mechanical pressures applied to the heating terminals will head and form these rivets. These heating currents are relatively displaced 120 degrees and their sum at any instant is *nil*. Hence either two become the means for removing the self-inductance and eddy currents which would otherwise be induced by the third. If the effective values of these currents are the same, no flux will flow in laminated iron core 15". If they are not equal, the action of this flux will tend to equalize them, and place them in such relation that they will not produce self-inductance and eddy currents because of the iron plates.

What I claim is:

1. The method of riveting pieces of metal together which consists of placing rivets or uniting members through holes in the said pieces of metal, in applying mechanical pressure upon opposite ends of said rivets or members, and conducting through said rivets or members two equal heating currents opposite in direction of flow.

2. The method of riveting pieces of metal together which consists of placing rivets or uniting members through holes in the said pieces of metal, in applying mechanical pressure upon opposite ends of said rivets or members, conducting through said rivets or members a plurality of heating currents, and equalizing said heating currents by linking with them a path of magnetic flux.

3. The method of riveting pieces of metal together which consists of placing rivets or uniting members through holes in the said pieces of metal applying mechanical pressure upon opposite ends of said rivets or members, and conducting through said rivets or members a plurality of heating currents in different directions, the sum of whose instantaneous values at any time is *nil*.

4. The method of riveting pieces of metal together which consists of placing rivets or uniting members through holes in the said pieces of metal, applying mechanical pressure upon the opposite ends of said rivet or members, conducting through said rivets or members a plurality of heating currents, and maintaining these currents approximately equal by a mutual inductive transfer of energy through a common linking magnetic flux.

5. The method of fastening pieces of metal together which consists of placing uniting members through holes in one or both of the said pieces of metal, in applying mechanical pressure upon the ends of said uniting members, and conducting through said uniting members heating electric currents opposite in direction of flow.

6. The method of fastening pieces of metal together which consists of placing uniting members in holes in one of the said pieces of metal, in applying mechanical pressure upon the projecting ends of said uniting members, and conducting through said members a plurality of heating currents in different directions.

In testimony whereof, I have hereunto signed my name in the presence of two subscribing witnesses at Atlanta, in the county of Fulton and State of Georgia, this 24th day of November, 1913.

CHARLES H. KICKLIGHTER.

Witnesses:
C. H. McADAMS,
W. A. MEDLOCK.